(12) United States Patent
Hallapuro et al.

(10) Patent No.: US 7,082,450 B2
(45) Date of Patent: Jul. 25, 2006

(54) IMPLEMENTATION OF A TRANSFORM AND OF A SUBSEQUENT QUANTIZATION

(75) Inventors: Antti Hallapuro, Tampere (FI); Kim Simelius, Tampere (FI)

(73) Assignee: Nokia Corporation, Espoo (FI)

( * ) Notice: Subject to any disclaimer, the term of this patent is extended or adjusted under 35 U.S.C. 154(b) by 536 days.

(21) Appl. No.: 09/943,241

(22) Filed: Aug. 30, 2001

(65) Prior Publication Data

US 2003/0078953 A1 Apr. 24, 2003

(51) Int. Cl.
*G06F 17/14* (2006.01)

(52) U.S. Cl. ........................................ 708/402; 382/250
(58) Field of Classification Search ................. 708/402; 382/250
See application file for complete search history.

(56) References Cited

U.S. PATENT DOCUMENTS

| | | | | |
|---|---|---|---|---|
| 5,129,015 A | | 7/1992 | Allen et al. | 382/56 |
| 5,519,503 A | * | 5/1996 | Ohki | 386/117 |
| 5,523,847 A | | 6/1996 | Feig et al. | 358/261.3 |
| 5,572,236 A | | 11/1996 | Feig et al. | 345/154 |
| 5,642,438 A | | 6/1997 | Babkin | 382/250 |
| 5,957,998 A | * | 9/1999 | Ozaki | 708/402 |
| 6,189,021 B1 | | 2/2001 | Shyu | 708/401 |
| 6,466,699 B1 | * | 10/2002 | Schwartz et al. | 382/244 |
| 2001/0031096 A1 | * | 10/2001 | Schwartz et al. | 382/250 |

FOREIGN PATENT DOCUMENTS

WO   WO 01/31906 A2   5/2001

OTHER PUBLICATIONS

The BinDCT: Fast Multiplierless Approximation of the DCT, Trac D. Tran, IEEE Signal Processing Letters, vol. 7, No. 6, Jun. 2000, XP-002242220 (4 pages).
International Search Report.
"H.26L Test Model Long Term No. 7 (TML-7) Draft0", Gisle Bjontegaard, Document VCEG-M81, ITU Video Coding Experts Group, 2001, relevant pages thereof.
"A 16-bit Architecture for H.26L, Treating DCT Transforms and Quantization", Jie Liang et al., Document VCEG-M16, ITU Video coding Experts Group (VCEG), 2001, relevant pages thereof.
"Development of Integer Cosine Transforms by the Principle of Dyadic Symmetry", W.K. Cham, IEEE Proceedings, vol. 136, Pt. 1, No. 4, 1989, pp. 276–280.

* cited by examiner

*Primary Examiner*—D. H. Malzahn
(74) *Attorney, Agent, or Firm*—Perma & Green, LLP

(57) ABSTRACT

The invention relates to an approximation of a DCT and a quantization which are to be applied subsequently to digital data for compression of this digital data. In order to improve the transform, it is proposed to simplify a predetermined transform matrix to require less operations when applied to digital data. In addition, elements of the simplified transform matrix constituting irrational numbers are approximated by rational numbers. These measures are compensated by extending a predetermined quantization to include the operations which were removed in the simplification of the predetermined transform matrix. The included operations are further adjusted to compensate for the approximation of elements of the simplified transform matrix by rational numbers. If the simplified transform matrix and the extended quantization are used as basis for implementation, a fast transform with a good resulting quality can be achieved. An approximation of an IDCT employed in decompression of compressed digital data can be simplified correspondingly.

32 Claims, 2 Drawing Sheets

IMPLEMENTATION OF A TRANSFORM AND OF A SUBSEQUENT QUANTIZATION

FIELD OF THE INVENTION

The invention relates to the processing of digital data. It relates more specifically to a method for implementing an approximation of a discrete cosine transform (DCT) and a quantization, which transform and which quantization are to be applied subsequently to digital data, in particular digital image data, for compression of said digital data. It equally relates to a method for implementing a dequantization and an approximation of an inverse discrete cosine transform (IDCT), wherein for decompression of digital data said quantization is to be applied in sequence with said inverse transform to compressed digital data. Finally, the invention relates to an encoder and to a decoder suited to carry out such a compression and such a decompression respectively.

BACKGROUND OF THE INVENTION

It is known from the state of the art to use a sequence of DCT and quantization for compressing digital data, for instance in order to enable an efficient transmission of this digital data. In particular a compression of digital image data is commonly achieved by using a DCT followed by a quantization of the DCT coefficients obtained by the DCT.

In a DCT of one-dimensional digital data, a respective sequence of source values of a predetermined number is transformed into transform coefficients. In video coding, the source values can be for instance pixel values or prediction error values. Each of the resulting transform coefficients represents a certain frequency range present in the source data. DCT of values f( ) into coefficients F( ) is defined as;

$$F(i) = \sqrt{\frac{2}{N}} \, C(i) \sum_{x=0}^{N-1} f(x) \cos\left(\frac{(2x+1)i\pi}{2N}\right), i = 0, 1, \ldots, N-1$$

$$C(k) = \begin{cases} \frac{1}{\sqrt{2}}, & k = 0 \\ 1, & k \neq 0 \end{cases}$$

In this equation, N is the predetermined number of source values in one sequence of source values.

For compression, image data is usually provided in blocks of two-dimensional digital data. For such data DCT is defined as:

$$F(i, j) = \frac{2}{N} C(i) C(j) \sum_{x=0}^{N-1} \sum_{y=0}^{N-1} f(x, y) \cos\left(\frac{(2x+1)i\pi}{2N}\right)$$

$$\cos\left(\frac{(2y+1)j\pi}{2N}\right), i = j = 0, 1, \ldots, N-1$$

$$C(k) = \begin{cases} \frac{1}{\sqrt{2}}, & k = 0 \\ 1, & k \neq 0 \end{cases}$$

DCT is a separable operation. That means that a two-dimensional DCT can be calculated with two consecutive one-dimensional DCT operations. Using the one-dimensional DCT operation is preferred because the complexity of a one-dimensional DCT is relative to N. while the complexity of a two-dimensional DCT is relative to $N^2$. For image data having a size of N*N, the total complexity of all the DCT operations is relative to $N^3$ or $N^2\log(N)$ for fast DCT. Thus large transforms, which also involve many non-trivial multiplications, are computationally very complex. Furthermore, the additionally required accuracy in bits may increase the word width. For complexity reasons DCT is commonly performed only for small block of values at a time, for example 4×4 or 8×8 values, which can be represented in form of a matrix with values f( ). FIG. 1 illustrates a DCT of such a 4×4 matrix 1.

First, each row of the matrix 1 is transformed separately to form a once transformed matrix 2. In the depicted matrix 1, a separate transformation of each row is indicated by 2-headed arrows embracing all values of the respective row. Then, each column of the once transformed matrix 2 is transformed separately to form the final transformed matrix 3 comprising the transform coefficients F( ). In the depicted matrix 2, a separate transformation of each column is indicated by 2-headed arrows embracing all values of the respective column.

The DCT defined by the above equation can also be written in matrix form. To this end, F(i) is first written in a more suitable form $$F(i) = \sum_{x=0}^{N-1} f(x) A(i, x), i = 0, 1, \ldots, N-1$$

$$A(i, x) = \sqrt{\frac{2}{N}} \, C(i) \cos\left(\frac{(2x+1)i\pi}{2N}\right)$$

Matrix A is a matrix of DCT basis functions. A two dimensional DCT can then be calculated with:

$$Y = AXA^T,$$

where matrix X denotes a source value matrix, and where matrix Y denotes the transform coefficients resulting in the DCT. The index T of a matrix indicates that the transpose of the matrix is meant.

After DCT, the actual compression is achieved by quantization of DCT coefficients. Quantization is achieved by dividing the transform coefficients with quantization values that depend on a quantization parameter qp:

$$Y'(i,j) = Y(i,j)/Q(qp)(i,j),$$

where Q(qp) is a quantization matrix, and where Y'(i,j) constitute quantized coefficients. The simplest form of quantization is uniform quantization where the quantization matrix is populated with one constant, for example:

$$Q(qp)(i,j) = qp.$$

The quantized coefficients constitute compressed digital data which has for example, after the encoding and possible further processing steps, a convenient form for transmission of said data.

When the compressed data is to be presented again after storing and/or transmission, it has first to be decompressed again.

Decompression is performed by reversing the operations done during compression. Thus, the quantized coefficients Y'(i,j) are inverse quantized in a first step by multiplying the quantized coefficients with values of quantization matrix:

$$Y(i,j) Y'(i,j) Q(qp)(i,j)$$

Next, the dequantized but still transformed coefficients Y(i,j) are inverse transformed in a second step by an inverse discrete cosine transform (IDCT):

$$X = A^T Y A,$$

where matrix Y denotes as in the DCT the transformed coefficients, and where matrix X denotes the regained source value matrix.

If infinite precision is used for all calculations, X will contain exactly the original pixel values. In practice, however, the coefficients are converted to integer values at least after quantization and inverse transform. As a result, the original pixels can not be exactly reconstructed. The more compression is achieved, the more deviation there is from the original pixels.

If the above described DCT and IDCT are implemented straight-forward, each conversion requires several multiplications, additions and/or subtractions. These operations, however, require on the one hand a significant amount of processor time, and on the other hand, multiplications are quite expensive operations with respect to circuit area in some architectures. In order to be able to transmit for example high quality motion displays, it is thus desirable to dispose of a conversion process which requires fewer multiplication steps without reducing the quality of the data regained in decompression.

Since the DCT is also a central operation in many image coding standards, it has been widely used, and a variety of solutions for the stated problem has been described in literature. These solutions generally feature the "butterfly operation" and/or combine some calculations from the operator matrix to the quantization step at the end of the DCT process.

The U.S. Pat. No. 5,523,847 describes for example a digital image processor for color image compression. In order to reduce the number of non-trivial multiplications in DCT, it is proposed in this document to factor the transform matrix in a way that decreases the number of non-trivial multiplications, non-trivial multiplications being multiplications or divisions by a factor other than a power of two. The trivial multiplications can be realized by bit-shifting, hence the name 'trivial'. More specifically, the transform matrix is factored into a diagonal factor and a scaled factor such that the diagonal factor can be absorbed into a later quantization step that and the scaled factor can be multiplied by a data vector with a minimum of non-trivial multiplications. In addition, it is proposed that remaining non-trivial multiplications are approximated by multiplications by rational numbers, since the computation can then be achieved only with additions, subtractions and shift operations. This leads to a problem in IDCT, however, since with the approximation, there may not exist an exact inverse transform any more for the transform. Therefore, repeating the DCT-IDCT process may result in severe deterioration in image quality. This may happen, e.g., when the image is transmitted several times over a communications link where DCT compression is utilized, Another approach is described in a document by Gisle Bjontegaard: "H.26L Test Model Long Term Number 7 (TML-7) draft0", ITU Video Coding Experts Group, 13th Meeting, Austin, Tex., USA 2–4 Apr., 2001, This document describes a DCT solution constituting the current test model for a compression method for ITU-T recommendation H.26L.

According to this document, instead of DCT, an integer transform can be used which has basically the same coding property as a 4×4 DCT. In the integer transform, four transform coefficients are obtained from four source data pixels respectively by four linear equations summing the pixels with predetermined weights. The transform is followed or preceded by a quantization/dequantization process, which performs a normal quantization/dequantization. Moreover, a normalization is required, since it is more efficient to transmit data having a normalized distribution than to transmit random data. Since the transform does not contain a normalization, the quantization/dequantization carries out in addition the normalization which is completed by a final shift after inverse transform. The quantization/dequantization uses 32 different quality parameter (QP) values, which are arranged in a way that there is an increase in the step size of about 12% from one QP to the next. Disadvantage of this approach is that it requires a 32-bit arithmetic and a rather high number of operations.

Another document proceeds from the cited TML-7 document: "A 16-bit architecture for H.26L, treating DCT transforms and quantization", Document VCEG-M16, Video Coding Experts Group (VCEG) 13th meeting, Austin, USA, 2–4 Apr., 2001, by Jie Liang, Trac Tran, and Pankaj Topiwala. This VCEG-M16 document mainly addresses a 4×4 transform, and proposes a fast approximation of the 4-point DCT, named the binDCT, for the H.26L standard. This binDCT can be implemented with only addition and right-shift operations. The proposed solution can be implemented to be fully invertible for lossless coding.

The proposed binDCT is based on the known Chen-Wang plane rotation-based factorization of the DCT matrix. For a 16-bit implementation of the binDCT, a lifting scheme is used to obtain a fast approximation of the DCT. Each employed lifting step is a biorthogonal transform, and its inverse also has a simple lifting structure. This means that to invert a lifting step, it is subtracted out what was added in at the forward transform. Hence, the original signal can still be perfectly reconstructed even if the floating-point multiplication results are rounded to integers in the lifting steps, as long as the same procedure is applied to both the forward and the inverse transform.

To obtain a fast implementation, the floating-point lifting coefficients are further approximated by rational numbers in the format of k/2m, where k and m are integers, which can be implemented by only shift and addition operations. To further reduce the complexity of the lifting-based fast DCT, a scaled lifting structure is used to represent the plane rotation. The scaling factors can be absorbed in the quantization stage.

The solution proposed in the VCEG-M16 document only requires 16-bit operations assuming that the source values are 9-bit values and less operations than the solution of the TML-7 document. More specifically, it requires for a 1-D DCT of four data values 10 additions and 5 shifts.

Further documents relating to image data compression are for instance the following, the contents of which are only addressed briefly:

U.S. Pat. No. 6,189,021, granted Feb. 13, 2001, proposes to employ a set of scaled weighting coefficients in the intrinsic multiplication stage of a six-stage DCT fast algorithm for one of two one-dimensional DCT operations so that a corresponding stage of the DCT fast algorithm for the other one of the one-dimensional DCT operations can be omitted.

U.S. Pat. No. 5,129,015, granted Jul. 7, 1992, makes use of a method similar to DCT but employing a simpler arithmetic for compressing still images without multiplication.

U.S. Pat. No. 5,572,236, granted Nov. 5, 1996, relates to a digital image processor for color image compression which minimizes the number of non-trivial multiplications in the DCT process by rearranging the DCT process such that non-trivial multiplications are combined in a single process step.

PCT application WO 01/31906, published May 3, 2001, relates to a transform-based image compression framework called local zerotree coding.

SUMMARY OF THE INVENTION

It is an object of the invention to reduce the operations required for conventional DCT and IDCT while avoiding the necessity of non-trivial multiplications. It is also an object of the invention to provide an alternative to known methods which requires less operations than the regular DCT or IDCT. It is further an object of the invention to guarantee a high quality of the digital data after decompression.

For compression of digital data, the objects of the invention are reached by a method comprising in a first step simplifying a predetermined transform matrix to require less operations when applied to digital data. In a second step, elements of the simplified transform matrix constituting irrational numbers are approximated by rational numbers. In order to compensate for these measures, a predetermined quantization is extended to include the operations which were removed in the simplification of the predetermined transform matrix. The included operations are further adjusted to compensate for the approximation of elements of the simplified transform matrix by rational numbers. Finally, the simplified transform matrix with the approximated elements and the extended quantization are employed as basis for implementing a sequence of a transform and a quantization which are to be applied to digital data that is to be compressed.

For decompression of compressed digital data, the objects are reached with a method in which a predetermined inverse transform matrix is processed according to the predetermined transform matrix in the proposed method for compression. In addition, a predetermined dequantization is extended according to the extension of the predetermined quantization in the proposed method for compression. The resulting extended dequantization and the resulting simplified inverse transform matrix with approximated elements can then be used as basis for implementing a sequence of a dequantization and an inverse transform which are to be applied to compressed digital data for achieving a decompression.

The objects of the invention are finally reached with an encoder comprising a corresponding transformer approximating a DCT and a corresponding quantization means, and with a decoder comprising a corresponding dequantization means and a corresponding transformer approximating an IDCT.

The invention proceeds from the idea that the number of operations required for a DCT can be reduced significantly, if on the one hand, operations are extracted from the transform matrix and absorbed in the quantization, and if on the other hand, the remaining entries not constituting a rational number are approximated by such a rational number. In order to ensure that decompression can be carried out correctly, however, it is proposed that in addition the approximation is compensated in the operations moved to the quantization.

It is an advantage of the invention that it enables a fast computation of the transform, since it enables a reduction of the number of required operations, e.g. compared to TML-7 and VCEG-M16, thus saving processor time. Still, the invention achieves a quality very close to the solution of the VCEG-M16 document. Since the invention moreover enables a consideration of the inversion properties of the transform operation by compensating the carried out approximations, a degradation of the quality of the processed data, especially at low bit rates, can be avoided. It is thus a further advantage of the invention that a better inversion accuracy is achieved compared e.g. to U.S. Pat. No. 5,523,847.

Preferred embodiments of the invention become apparent from the subclaims.

The proposed step of simplifying the predetermined transform matrix to require less operations when applied to digital data preferably comprises factoring the predetermined transform matrix into two factors, one factor constituting a diagonal matrix and the other factor constituting a simplified transform matrix. The diagonal matrix then comprises the operations removed from the simplified transform matrix.

Advantageously, the rational numbers by which the remaining entries of the simplified transform matrix are approximated are given by fractions with a denominator of $2^n$, wherein n is an integer. Such rational numbers are particularly suited for binary arithmetic, since a multiplication or division by $2^n$ can be realized by bit-shift operations. Thus all multiplications can be avoided in DCT with the proposed approximation.

For a given transform matrix, e.g., a 4×4 DCT matrix, and for a selected rational number for approximating remaining entries in the simplified matrix, a single set of equations including only additions, subtractions and shifts can then be determined for each one-dimensional transform that has to be performed for transforming one- or two-dimensional digital data values.

The adjustment to the approximation in the quantization step preferably ensures that the applied transform has an inverse transform. This can be achieved by ensuring that $A^T A = I$, where matrix A is in this case a matrix for which all extracted operations were re-included in the simplified transform matrix after approximation of the remaining entries and after compensation of the approximation in the extracted operations. This guarantees that an approximation of an IDCT can be performed with good quality.

For a given transform matrix, e.g. a 4×4 DCT matrix, and for a selected rational number for approximating remaining entries in the simplified matrix, also the required adjustment of specific values in the extracted operations can be calculated in a general way.

However, in larger transforms like the 8×8 transform, it may additionally be necessary to adjust the approximations of the simplified matrix, since approximating the DCT transform coefficients in an optimized implementation leads to a forward-inverse transform pair that is incomplete, leading to a "spill" of pixel values to non-adjacent, i.e. 2 pixels away, pixels. This results in blurring of the image. By a correct choice of the approximations, the off-diagonal elements of the matrix resulting from forward and inverse transform of a unity matrix are nullified. In very large matrices, it may not be possible to adjust the approximations sufficiently. In such cases, the approximations may be adjusted to produce an optimal result in the least-squares sense. Furthermore, optimization is needed to limit the solutions to a Dirichlet set, i.e., to certain rational numbers.

For the proposed quantization step, preferably a quantization matrix is determined by multiplying a predetermined sequence of quantization coefficients with a matrix extracted from the transform matrix for simplifying the transform matrix. The extracted matrix comprises the operations extracted from the predetermined transform matrix and is adjusted to compensate for the approximation of remaining entries in the simplified transform matrix by rational numbers.

The proposed method can be employed equally for one-dimensional as for a two-dimensional transforms. For a two-dimensional transform to be applied to two-dimensional digital data, simplification and approximation is carried out for the predetermined transform matrix and for the transpose of the simplified transform matrix. These two matrices are then employed as basis for implementing the transform. The extended quantization includes in this case operations removed from both of said matrices, which operations are adjusted to compensate for the approximations in both of said matrices.

The presented preferred embodiments can be employed not only for the method according to the invention for implementing transform and quantization, but in a corresponding manner also for the method for implementing inverse transform and dequantization, for the encoder and for the decoder according to the invention.

In practice, the transform matrices calculated for transform can usually be used in transposed form for inverse transform without performing any separate calculations, if the operator matrix for the transform is unitary, like a DCT transform matrix. In this case, equally the operations to be included in the extended quantization can be used at the same time for the extension of a predetermined dequantization.

The invention can be employed for the compression of any kind of digital data for any purpose, e.g. in a mobile communications system like GSM (Global System for Mobile communication) or UMTS (Universal Mobile Telecommunication System).

The invention can be implemented for example as a part of an MPEG codec.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims instead.

BRIEF DESCRIPTION OF THE FIGURES

In the following, the invention is explained in more detail with reference to drawings, of which

DETAILED DESCRIPTION OF THE INVENTION

Figure 1:
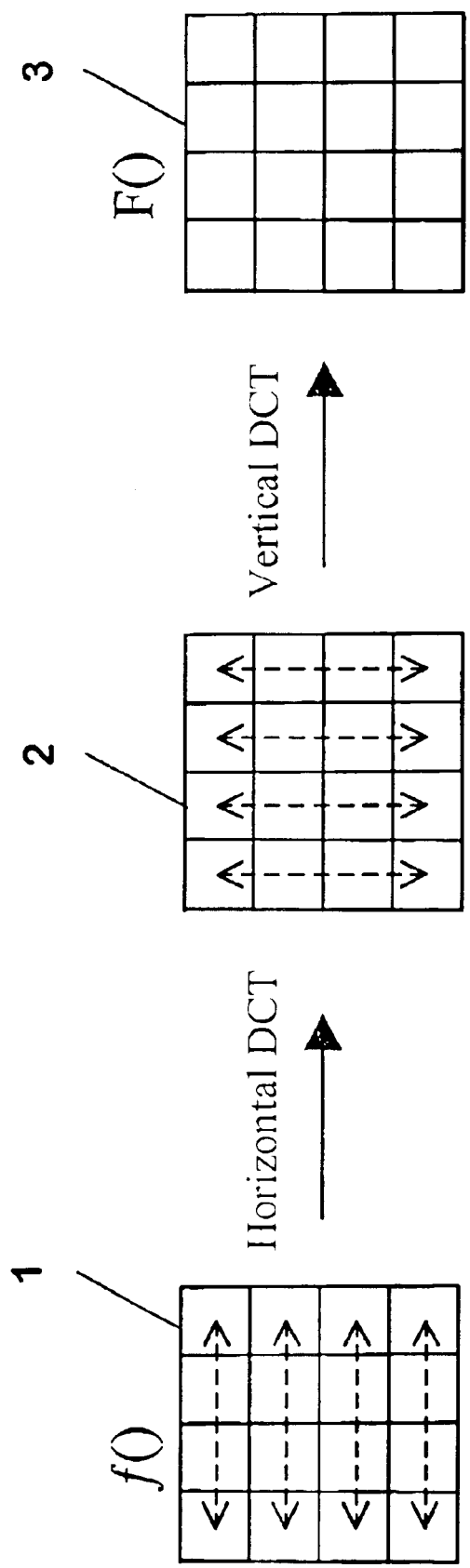
FIG. 1 illustrates a DCT applied to a matrix of 4×4 values.

FIG. 1 has already been described above.

Figure 2:
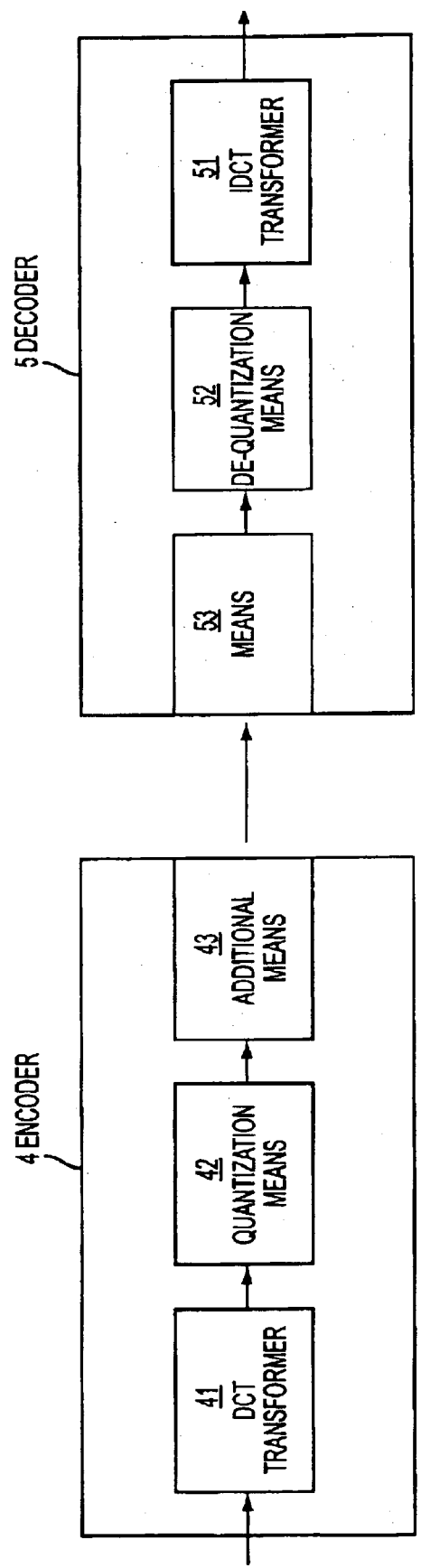
FIG. 2 schematically shows a block diagram of an encoder and of a decoder employed for compressing and decompressing digital data according to an embodiment of the invention.

The block diagram of FIG. 2 includes components of an exemplary system in which the invention can be realized. On the left-hand side of FIG. 2, an encoder 4 is depicted. The encoder 4 is part of a first unit, e.g. a piece of user equipment of a mobile communications system, capable of providing and transmitting video data. Connected between its input and its output, the encoder 4 comprises a DCT transformer 41, a quantization means 42 and additional means 43. On the right-hand side of FIG. 2, a decoder 5 is depicted. The decoder 5 is part of a second unit, e.g. equally a piece of user equipment of a mobile communications system, capable of receiving and displaying video data. Connected between its input and its output, the decoder 5 comprises a means 53, a dequantization means 53 and an IDCT transformer 51.

In case video data is to be transmitted from the first unit to the second unit, e.g. via a communications network, the video data is provided to the encoder 4 of the first unit as digital data. In the encoder 4, the digital data is first transformed by the DCT transformer 41, and then quantized by the quantization means 42. After quantization, the data is further processed by the additional means 43. This processing includes encoding of the quantized data for transmission, possibly preceded by a further compression, and is not dealt with in this document, since it is not relevant to the invention.

The processed data is then transmitted from the first unit comprising the encoder 4 to the second unit comprising the decoder 5. The second unit receives the data and forwards it to the decoder 5. In the decoder 5, in a first step some processing is carried out in the means 53, which processing corresponds in an inverse way to the processing in block 43 of the encoder 4. Thus, the processing, which is not dealt with in this document, may include decoding, followed possibly by a first step of decompression. The processed data is then dequantized by the dequantization means 52 and moreover subjected to an IDCT by the IDCT transformer 51. The regained video signals provided by the IDCT 51 are output by the decoder 5 for display by the second unit to a user.

An embodiment of an implementation according to the invention of the DCT transformer 41 and of the quantization means 42 of the encoder 4 of FIG. 2 will now be derived. For this implementation, which proceeds from the DCT and the quantization as described in the background of the invention, it is assumed that compression of input digital image data is to be carried out for blocks of digital data comprising 4×4 values. An embodiment of an implementation according to the invention of a corresponding decompression by the dequantization means 52 and the IDCT transformer 51 of the decoder 5 of FIG. 2 will be indicated as well.

It is to be noted that in the presented equations, the same denomination may be employed in different equations for different matrices. The kind of the respective matrices will be indicated for each equation at least if a corresponding denomination was used before for another kind of matrix In accordance with the above mentioned equation for DCT, $Y=AXA^T$, the 4×4 forward DCT transform can be calculated as follows:

$$Y = AXA^T = \begin{bmatrix} a & a & a & a \\ b & c & -c & -b \\ a & -a & -a & a \\ c & -b & b & -c \end{bmatrix} \cdot \begin{bmatrix} x_{11} & x_{12} & x_{13} & x_{14} \\ x_{21} & x_{22} & x_{23} & x_{24} \\ x_{31} & x_{32} & x_{33} & x_{34} \\ x_{41} & x_{42} & x_{43} & x_{44} \end{bmatrix} \cdot \begin{bmatrix} a & b & a & c \\ a & c & -a & -b \\ a & -c & -a & b \\ a & -b & a & -c \end{bmatrix},$$

where Y is the desired transformed matrix, where X is a matrix containing the 4×4 source values $x_{ij}$ (i,j=1–4), and where A is the 4×4 DCT transform matrix. The values a, b and c of matrix A can be obtained easily from the above definition for A(i,x):

$$a = 1/2$$

$$b = \sqrt{1/2} \cdot \cos(\pi/8)$$

$$c = \sqrt{1/2} \cdot \cos(3\pi/8)$$

In the equation for the forward DCT, matrix A can be factorized, resulting in a diagonal matrix B and a simplified transform matrix C. A corresponding factorization can be carried out for the transposed form of A, $A^T$. If d is denoted in addition as d=c/b, the forward DCT can be written as $$Y = BCXC^T B = \begin{bmatrix} a & 0 & 0 & 0 \\ 0 & b & 0 & 0 \\ 0 & 0 & a & 0 \\ 0 & 0 & 0 & b \end{bmatrix} \cdot \begin{bmatrix} 1 & 1 & 1 & 1 \\ 1 & d & -d & -1 \\ 1 & -1 & -1 & 1 \\ d & -1 & 1 & -d \end{bmatrix} \cdot$$

$$\begin{bmatrix} x_{11} & x_{12} & x_{13} & x_{14} \\ x_{21} & x_{22} & x_{22} & x_{24} \\ x_{31} & x_{32} & x_{33} & x_{34} \\ x_{41} & x_{42} & x_{43} & x_{44} \end{bmatrix} \cdot \begin{bmatrix} 1 & 1 & 1 & d \\ 1 & d & -1 & -1 \\ 1 & -d & -1 & 1 \\ 1 & -1 & 1 & -d \end{bmatrix} \cdot$$

$$\begin{bmatrix} a & 0 & 0 & 0 \\ 0 & b & 0 & 0 \\ 0 & 0 & a & 0 \\ 0 & 0 & 0 & b \end{bmatrix}$$

Since B is a diagonal matrix, the above equation can be written as $$Y = D \otimes (CXC^T) \otimes D^T = \begin{bmatrix} a & a & a & a \\ b & b & b & b \\ a & a & a & a \\ b & b & b & b \end{bmatrix} \otimes$$

$$\left( \begin{bmatrix} 1 & 1 & 1 & 1 \\ 1 & d & -d & -1 \\ 1 & -1 & -1 & 1 \\ d & -1 & 1 & -d \end{bmatrix} \cdot \begin{bmatrix} x_{11} & x_{12} & x_{13} & x_{14} \\ x_{21} & x_{22} & x_{22} & x_{24} \\ x_{31} & x_{32} & x_{33} & x_{34} \\ x_{41} & x_{42} & x_{43} & x_{44} \end{bmatrix} \cdot \right.$$

$$\left. \begin{bmatrix} 1 & 1 & 1 & d \\ 1 & d & -1 & -1 \\ 1 & -d & -1 & 1 \\ 1 & -1 & 1 & -d \end{bmatrix} \right) \otimes \begin{bmatrix} a & b & a & b \\ a & b & a & b \\ a & b & a & b \\ a & b & a & b \end{bmatrix}$$

where $\otimes$ is used to indicate that the respective two matrices are multiplied entry-wise instead of a full matrix multiplication.

After combining D and its transposed form $D^T$ into E, the final DCT is:

$$Y = (CXC^T) \otimes E = \left( \begin{bmatrix} 1 & 1 & 1 & 1 \\ 1 & d & -d & -1 \\ 1 & -1 & -1 & 1 \\ d & -1 & 1 & -d \end{bmatrix} \cdot \begin{bmatrix} x_{11} & x_{12} & x_{13} & x_{14} \\ x_{21} & x_{22} & x_{22} & x_{24} \\ x_{31} & x_{32} & x_{33} & x_{34} \\ x_{41} & x_{42} & x_{43} & x_{44} \end{bmatrix} \cdot \right.$$

$$\left. \begin{bmatrix} 1 & 1 & 1 & d \\ 1 & d & -1 & -1 \\ 1 & -d & -1 & 1 \\ 1 & -1 & 1 & -d \end{bmatrix} \right) \otimes \begin{bmatrix} a^2 & ab & a^2 & ab \\ ab & b^2 & ab & b^2 \\ a^2 & ab & a^2 & ab \\ ab & b^2 & ab & b^2 \end{bmatrix}$$

$$= Y_c \otimes E$$

In a next step, the coefficient d is converted into a fixed-point format which can be represented by a rational fraction with a denominator of $2^n$. The value of d when considering eight decimal places is 0.41421356. Two of the possible fixed-point approximations for d are 3/8=0.375 and 7/16=0.4375, both of which can be implemented with the same number of add and shift operations. More accurate approximations such as 13/32, 27/64 and 53/128 require more additions and shifts but do not improve the achieved compression significantly in practice. Thus, 7/16, which is closer to d than 3/8, is selected as fixed-point format for d.

After converting coefficient d to a fixed-point representation, b has to be adjusted in a way that the transform has an inverse transform. The condition for an inverse transform to exist is given by:

$$A^T A = I.$$

When solving the above equation for a matrix A which was reassembled from factors B and C after the approximation of d, the condition for an adjusted b is found to be:

$$b = \sqrt{\frac{0.5}{1 + d^2}}.$$

Matrix E is thus adjusted by substituting this new value for the old value of coefficient b.

Now, a simplified DCT can be implemented in the DCT transformer 41 of encoder 4 from which matrix E was extracted. That is, the implementation is based on the equation $Y_C = CXC^T$ wherein matrix C comprises approximated coefficients d, resulting in modified DCT coefficients $Y_C$. Matrix E will combined with the subsequent quantization step, as will be explained below The actual implementation of the simplified DCT may depend on a specific transformer architecture, in which it may be most important to have few total operations or to have no multiplications at all.

Two different sets of equations that can be employed in an implementation of the simplified DCT transformer will now be proposed. The equations are suited to perform a 4-point one-dimensional simplified DCT which is based on simplified DCT transform matrix C as derived above. In matrix C, coefficient d is chosen to be d=7/16. In both sets of equations, X[i], i=0–3 constitutes a sequence of 4 values that are to be transformed and Y[i], i=0–3 a sequence of 4 transformed values, while e and f are auxiliary variables.

The first proposed set of equations is:

$$e = X[0] + X[3]$$

$$f = X[1] + X[2]$$

$$Y[0] = e + f$$

$$Y[2] = e - f$$

$$e = X[0] - X[3]$$

$$f = X[1] - X[2]$$

$$Y[1] = e + 7*f/16$$

$$Y[3] = 7*e/16 - f$$

The two divisions in this set of equations are actually bit shifts. This set of equation thus requires 8 additions 2 multiplications and 2 shifts for a total of 12 operations.

The second proposed set of equations is:

$e=X[0]+X[3]$ $f=X[1]+X[2]$ $Y[0]=e+f$ $Y[2]=e-f$ $e=X[0]-X[3]$ $f=X[1]-X[2]$ $Y[1]=e+(f-f/8)/2$ $Y[3]=(e-e/3)/2-f$

The second set of equations uses only additions and shifts, and produces identical results to the first set. Again, divisions are actually bit shifts. This version requires 10 additions and 4 shifts for total of 14 operations. The number of operations is larger than in the first version, but the resulting complexity is still lower if multiplication is an expensive operation. Moreover, the results of a multiplication require a larger dynamic range.

Either set of equations can be used for transforming two-dimensional data by applying it to the respective set of values that is to be transformed.

The simplified transform is followed by an adapted quantization step. The implementation of the quantization depends on the used DCT. In the above mentioned TML-7 document, a uniform quantization is used. In fast DCT, a non-uniform quantization matrix must be used, since some of the DCT multiplications are combined with quantization multiplications. The above mentioned binDCT of document VCEG-M16 moreover uses divisions for quantization and requires only 16-bit operations. A division, however, is generally a rather slow operation. Therefore, in the presented embodiment a uniform quantization using only multiplications is implemented in quantization means 42.

As already mentioned above, quantization can be performed using division so that $Y'(i,j)=Y(i,j)/Q(qp)(i,j).$ Since division is a costly operation, multiplication can be used instead. For this purpose quantization matrix R is calculated as $R(qp)(i,j)=1.0/Q(qp)(i,j),$ after which quantization can be performed with multiplication:

$Y'(i,j)=Y(i,j)R(qp)(i,j).$

In the quantization proposed in document TML-7, the quantization coefficients are approximately as shown below. Other coefficients could be used as well.

$a(qp) = 2.5000, 2.8061, 3.1498, 3.5354, 3.9684, 4.4543, 4.9998,$ $5.6120, 6.2992, 7.0706, 7.9364, 8.9082, 9.9990, 11.2234,$

-continued $12.5970, 14.1404, 15.8720, 17.8155, 19.9971, 22.4458,$ $25.1944, 28.2795, 31.7424, 35.6293, 39.9922, 44.8894,$ $50.3863, 56.5562, 63.4817, 71.2552, 79.9806, 89.7745.$ In order to be able to absorb the matrix E extracted from the DCT in the quantization, a quantization matrix R for quantization parameter qp is calculated as $R(qp)(i,j)=E(i,j)/a(qp).$ The final quantized coefficients Y'(i,j) could now be determined from the transform coefficients $Y_C(i,j)$ resulting in the simplified DCT by $Y'(i,j)=Y_C(i,j) \cdot R(qp)(i,j) \pm f,$ where f is ⅓ for intra blocks and ⅙ for inter blocks and has the same sign as $Y_C(i,j)$ in accordance with the TML-7 documentation. An intra block is a macroblock which is encoded based only on values within the current image, while an inter block is a macroblock which is encoded based in addition on values within other images. Each macroblock is composed of several subblocks, e.g. the blocks of 4×4 values of the presented example, which are DCT transformed and quantized separately.

First, however, the quantization is changed to use only fixed-point values. To this end, the values of R and f are converted prior to quantization to fixed point values by multiplying them by $2^n$ and by rounding the results to integer values. n is the number of fractional bits used for the fixed-point values. By choosing n=17, the coefficients of R will fit in 16-bit, and thus only 16-bit multiplications are required in quantization. More specifically, 16-bit multiplications are required that produce 32-bit results.

The fixed-point quantization is then implemented in quantization means 42 of encoder 4 based on the equation:

$Y'(i,j)=(Y_C(i,j) \cdot R(qp)(i,j) \pm f)/2^n,$ where R and f comprise only fixed-point values. The values of Y'(i,j) are output by the quantization means 42 as the desired compressed digital image data.

For decompression of the compressed digital image data in the decoder 5 of FIG. 2, the dequantization means 52 and the IDCT transformer 53 are implemented in a corresponding way as the quantization means 42 and the DCT transformer 41 of encoder 4. The basic IDCT is calculated from the basic DCT as:

$X=A^T YA,$ where matrix X contains the desired, regained source values, where matrix A is the original DCT transform matrix, and where matrix Y contains dequantized values obtained by a decompression as described in the background of the invention.

Proceeding from this equation, the inverse transform can be formulated correspondingly to the forward transform using an extracted matrix E:

$X=C^T(Y \otimes E)C.$ where matrices C and $C^T$ correspond to the matrices C and $C^T$ used for the reduced DCT in block 41 of the encoder 4. Matrix E of this equation can be absorbed in the dequantization step preceding the IDCT.

This can be realized similarly to absorbing matrix E in quantization. Dequantization coefficients are inverse values of the quantization coefficients.

A dequantization matrix Q for a quantization parameter qp including matrix E can be calculated as:

$$Q(qp)(i,j)=E(i,j)\cdot a(qp).$$

The compressed coefficients Y'(i,j) can therefore be dequantized to dequantized coefficients X'(i,j) according to the equation:

$$X'(i,j)=Y'(i,j)\cdot Q(qp)(i,j).$$

In this equation, X'(i,j) corresponds to the term Y⊗E in the above equation for inverse transform X=$C^T$(Y⊗E)C.

When fixed-point numbers are used, values of Q are converted to fixed-point values prior to dequantization by multiplying them by $2^n$ and rounding results to integer values. By choosing n=5 for dequantization, all calculations in dequantization can be done using only 16-bit operations. Fixed-point dequantization is then implemented in dequantization means 52 of decoder 5 based on the equation:

$$X'(i,j)=Y(i,j)\cdot Q(qp)(i,j),$$

in which Q contains only fixed-point numbers. After dequantization the values of X'(i,j) should be normalized by $2^n$, but normalization is postponed to be done after final IDCT in order to achieve a better accuracy.

The simplified inverse transform can then be implemented in the IDCT transformer 51 of decoder 5 according to the equation:

$$X=C^T X'C$$

after which fixed-point values of X are converted to integer values based on the equation:

$$X(i,j)=(X(i,j)+2^{n-1})/2^n,$$

where the division by $2^n$ is realized with a simple arithmetic bit-shift.

The actual implementation of the IDCT transformer 51 can comprise a set of equations including only additions, subtractions and shifts corresponding to those presented for the DCT transformer 41.

According to another embodiment of the invention, an 8×8 DCT and IDCT can be implemented as presented in the following. In accordance with the equation for DCT, Y=AX$A^T$, the 8×8 forward DCT transform can be calculated as follows:

$$Y = AXA^Y = \begin{bmatrix} a & a & a & a & a & a & a & a \\ b & c & d & e & -e & -d & -c & -b \\ f & g & -g & -f & -f & -g & g & f \\ c & -e & -b & -d & d & b & e & -c \\ a & -a & -a & a & a & -a & -a & a \\ d & -b & e & c & -c & -e & b & -d \\ g & -f & f & -g & -g & f & -f & g \\ e & -d & c & -b & b & -c & d & -e \end{bmatrix} \cdot X \cdot A^T,$$

where Y is the desired transformed matrix, where X is a matrix containing the 8×8 source values $x_{ij}$ (i,j=1–8), as above in the 4×4 embodiment, where A is the 8×8 DCT transform matrix, written open on the right-hand side of the equation, and where $A^T$ is the transpose of A. The values a, b, c, d, e, f and g of matrix A can be obtained easily from the above definition for A(i,x):

$a=1/(2\sqrt{2})$ $b=\frac{1}{2}\cdot\cos(\pi/16)$ $c=\frac{1}{2}\cdot\cos(3\pi/16)$ $d=\frac{1}{2}\cdot\cos(5\pi/16)$ $e=\frac{1}{2}\cdot\cos(7\pi/16)$ $f=\frac{1}{2}\cdot\cos(\pi/8)$ $g=\frac{1}{2}\cdot\cos(3\pi/8)$ In the equation for the forward DCT, matrix A can be factorized, resulting in a diagonal matrix B and a simplified transform matrix C. A corresponding factorization can be carried out for the transposed form of A, $A^T$. If we use the notation $x_y$=x/y, the forward DCT can be written as $$Y = BCXC^T B$$

$$= \begin{bmatrix} a & 0 & 0 & 0 & 0 & 0 & 0 & 0 \\ 0 & b & 0 & 0 & 0 & 0 & 0 & 0 \\ 0 & 0 & f & 0 & 0 & 0 & 0 & 0 \\ 0 & 0 & 0 & b & 0 & 0 & 0 & 0 \\ 0 & 0 & 0 & 0 & a & 0 & 0 & 0 \\ 0 & 0 & 0 & 0 & 0 & b & 0 & 0 \\ 0 & 0 & 0 & 0 & 0 & 0 & f & 0 \\ 0 & 0 & 0 & 0 & 0 & 0 & 0 & b \end{bmatrix} \cdot$$

$$\begin{bmatrix} 1 & 1 & 1 & 1 & 1 & 1 & 1 & 1 \\ 1 & c_b & d_b & e_b & -e_b & -d_b & -c_b & -1 \\ 1 & g_f & -g_f & -1 & -1 & -g_f & g_f & 1 \\ c_b & -e_b & -1 & -d_b & d_b & 1 & e_b & -c_b \\ 1 & -1 & -1 & 1 & 1 & -1 & -1 & 1 \\ d_b & -1 & e_b & c_b & -c_b & -e_b & 1 & -d_b \\ g_f & -1 & 1 & -g_f & -g_f & 1 & -1 & g_f \\ e_b & -d_b & c_b & -1 & 1 & -c_b & d_b & -e_b \end{bmatrix} \cdot X \cdot C^T \cdot B$$

Since B is a diagonal matrix, the above equation can, as in the 4×4 case, be written as $$Y = D \otimes (CXC^T) \otimes D^T$$

$$= \begin{bmatrix} a & a & a & a & a & a & a & a \\ b & b & b & b & b & b & b & b \\ f & f & f & f & f & f & f & f \\ b & b & b & b & b & b & b & b \\ a & a & a & a & a & a & a & a \\ b & b & b & b & b & b & b & b \\ f & f & f & f & f & f & f & f \\ b & b & b & b & b & b & b & b \end{bmatrix} \otimes (CXC^T) \otimes$$

$$\begin{bmatrix} a & b & f & b & a & b & f & b \\ a & b & f & b & a & b & f & b \\ a & b & f & b & a & b & f & b \\ a & b & f & b & a & b & f & b \\ a & b & f & b & a & b & f & b \\ a & b & f & b & a & b & f & b \\ a & b & f & b & a & b & f & b \\ a & b & f & b & a & b & f & b \end{bmatrix}$$

where ⊗ is used to indicate that the respective two matrices are multiplied entry-wise instead of a full matrix multiplication.

After combining D and its transposed form $D^T$ into E, the final DCT is:

$$Y = (CXC^T) \otimes E$$

$$= \left( \begin{bmatrix} 1 & 1 & 1 & 1 & 1 & 1 & 1 & 1 \\ 1 & c_b & d_b & e_b & -e_b & -d_b & -c_b & -1 \\ 1 & g_f & -g_f & -1 & -1 & -g_f & g_f & 1 \\ c_b & -e_b & -1 & -d_b & d_b & 1 & e_b & -c_b \\ 1 & -1 & -1 & 1 & 1 & -1 & -1 & 1 \\ d_b & -1 & e_b & c_b & -c_b & -e_b & 1 & -d_b \\ g_f & -1 & 1 & -g_f & -g_f & 1 & -1 & g_f \\ e_b & -d_b & c_b & -1 & 1 & -c_b & d_b & -e_b \end{bmatrix} \cdot X \cdot C^T \right) \otimes$$

$$\begin{bmatrix} a^2 & ab & af & ab & a^2 & ab & af & ab \\ ab & b^2 & bf & b^2 & ab & b^2 & bf & b^2 \\ af & bf & f^2 & bf & af & bf & f^2 & bf \\ ab & b^2 & bf & b^2 & ab & b^2 & bf & b^2 \\ a^2 & ab & af & ab & a^2 & ab & af & ab \\ ab & b^2 & bf & b^2 & ab & b^2 & bf & b^2 \\ af & bf & f^2 & bf & af & bf & f^2 & bf \\ ab & b^2 & bf & b^2 & ab & b^2 & bf & b^2 \end{bmatrix}$$

$$= Y_C \otimes E$$

In a next step, the coefficients $c_b$, $d_b$, $e_b$ and $g_f$ are converted into a fixed-point format which can be represented by a rational fraction with a denominator of $2^n$. Close approximations are $c_b = 7/8$, $d_b = 9/16$, $e_b = 3/16$ and $g_f = 7/16$.

After converting coefficients $c_b$, $d_b$, $e_b$ and $g_f$ to a fixed-point representation, b and f have to be adjusted in a way that the transform has an inverse transform. The condition for an inverse transform to exist is again given by:

$$A^T A = I.$$

When solving the above equation for a matrix A which was reassembled from factors B and C after the approximation of $c_b$, $d_b$, $e_b$ and $g_f$ the condition for adjusted b and f are found to be:

$$b = \frac{1}{\sqrt{2}} \frac{1}{\sqrt{1+c_b^2+d_b^2+e_b^2}},$$

$$f = \frac{1}{2} \frac{1}{\sqrt{1+g_f^2}}.$$

Matrix E is thus adjusted by substituting these new value for the old value of coefficients b and f.

However, to fulfill the condition $A^T A = I$, the values for $c_b$, $d_b$ and $e_b$ have to be chosen differently, since otherwise the product $A^T A$ features non-zero off-diagonal elements. The necessary condition for the 8×8 case is $$d_b - c_b + e_b(d_b + c_b) = 0,$$

which can be fulfilled by choosing $c_b = 15/16$, $d_b = 9/16$ and $e_b = 1/4$.

Now, a simplified DCT can again be implemented in the DCT transformer 41 of encoder 4 from which matrix E was extracted. That is, the implementation is based on the equation $Y_C = CXC^T$, wherein matrix C comprises approximated coefficients $c_b$, $d_b$, $e_b$ and $g_f$, resulting in modified DCT coefficients $Y_C$. Matrix E will be combined with the subsequent quantization step similarly as explained above for the 4×4 DCT.

According to a third embodiment of the invention, the approximations are adjusted for the condition $A^T A = I$ by optimizing the selection of fractional numbers in the transform. The fractional numbers are selected so that the off-diagonal elements of the matrix $A^T A$ are as close to zero as possible in the implementation sense. The solution of the optimization is limited to a Dirichlet set, i.e., to certain rational numbers.

According to a fourth embodiment of the invention approximations of a fast-DCT algorithm are adjusted for the condition $A^T A = I$ by optimizing the selection of fractional numbers in the transform.

In the whole, it becomes apparent from the described embodiments of the invention that efficient alternative implementations for compressing digital data are presented. The implementation can be realized to be either more accurate than known implementations or faster or both.

Thus, while there have been described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for implementing an approximation of a discrete cosine transform (DCT) and for implementing a quantization operation, the discrete cosine transform and quantization operation to be applied in sequence to digital data for compression of said digital data, the method comprising:

simplifying a predetermined transform matrix to require less operations when applied to digital data, thereby forming a simplified transform matrix;

approximating elements of said simplified transform matrix constituting irrational numbers by rational numbers;

extending a predetermined quantization operation to include operations removed by simplifying the predetermined transform matrix, thereby forming an extended quantization operation;

adjusting the extended quantization operation to compensate for approximation of elements of said simplified transform matrix by rational numbers; and employing said simplified transform matrix with said approximated elements and said extended quantization operation as basis for implementing said sequence of discrete cosine transform and quantization operation.

2. A method according to claim 1, wherein said step of simplifying said predetermined transform matrix to require less operations when applied to digital data comprises factoring said predetermined transform matrix into a diagonal matrix to be used for extending said predetermined quantization operation and a simplified transform matrix.

3. A method according to claim 1, wherein said rational numbers can be represented by fractions having a denominator equal to $2^n$, wherein n is an integer.

4. A method according to claim 3, wherein in said transform implementation divisions are realized by bit-shifting.

5. A method according to claim 1, wherein said approximation is adjusted in a way ensuring that a resulting transform has an inverse transform, i.e. that a transpose of said predetermined transform matrix, including said approximations, multiplied by said predetermined transform matrix, including said approximations, is equal to an identity matrix.

6. A method according to claim 1, wherein said predetermined transform matrix is a 4×4 matrix of a form:

$$\begin{bmatrix} a & a & a & a \\ b & c & -c & -b \\ a & -a & -a & a \\ c & -b & b & -c \end{bmatrix},$$

wherein a=½, b=$\sqrt{½}$·cos (π/8), c=$\sqrt{½}$ cos(3•/8), wherein 'c' is substituted in said matrix according to an equation d=c/b, and wherein said predetermined transform matrix is simplified by factoring said predetermined transform matrix into a diagonal matrix comprising diagonal values {a, b, a, b} and a simplified transform matrix comprising only elements having absolute values of '1' and 'd', which diagonal matrix is to be used for extending said predetermined quantization operation.

7. A method according to claim 6, wherein in said simplified transform matrix said value 'd' is approximated by a rational number 7/16.

8. A method according to claim 6, wherein in said simplified transform matrix said value 'd' is approximated by a rational number, and wherein in said diagonal matrix said value 'b' is adjusted to $$b = \sqrt{\frac{0.5}{1+d^2}},$$

'd' being in said equation said rational number.

9. A method according to claim 6, wherein in said simplified transform matrix said value 'd' is approximated by a rational number 7/16, and wherein said transform is implemented for a transform of a one-dimensional sequence of four values X[0], X[1], X[2], X[3] respectively with the following equations:

$e=X[0]+X[3]$, $f=X[1]+X[2]$, $Y[0]=e+f$, $Y[2]=e-f$, $e=X[0]-X[3]$, $f=X[1]-X[2]$, $Y[1]=e+(f-f/8)/2$, and $Y[3]=(e-e/8)/2-f$, wherein Y[0], Y[1], Y[2], Y[3] is a one-dimensional sequence of four transformed values, and wherein e and f are auxiliary variables.

10. A method according to claim 1, wherein said predetermined transform matrix is a 8×8 matrix of a form:

$$\begin{bmatrix} a & a & a & a & a & a & a & a \\ b & c & d & e & -e & -d & -c & -b \\ f & g & -g & -f & -f & -g & g & f \\ c & -e & -b & -d & d & b & e & -c \\ a & -a & -a & a & a & -a & -a & a \\ d & -b & e & c & -c & -e & b & -d \\ g & -f & f & -g & -g & f & -f & g \\ e & -d & c & -b & b & -c & d & -e \end{bmatrix}$$

wherein a=1/(2$\sqrt{2}$), b=½·cos (π/16), c=½·cos (3π/16), d=½·cos (5π/16), e=½·cos (7π/16), f=½·cos (π/8), g=½·cos (3π/8), wherein 'c' is substituted in said matrix according to an equation $C_b$=c/b, wherein 'd' is substituted in said matrix according to an equation $d_b$=d/b, wherein 'e' is substituted in said matrix according to an equation $e_b$=e/b, wherein 'g' is substituted in said matrix according to an equation $g_f$=g/f, and wherein said predetermined transform matrix is simplified by factoring said predetermined transform matrix into a diagonal matrix comprising diagonal values {a, b, f, b, a, b, f, b} and a simplified transform matrix comprising only elements having absolute values of '1', '$c_b$', '$d_b$', '$e_b$' and '$g_f$', which diagonal matrix is to be used for extending said predetermined quantization operation.

11. A method according to claim 10, wherein in said simplified transform matrix said value '$c_b$' is approximated by a rational number 15/16, said value '$d_b$' is approximated by a rational number 9/16, said value '$e_b$' is approximated by a rational number ¼, and said value '$g_f$' is approximated by a rational number 7/16.

12. A method according to claim 10, wherein in said simplified transform matrix said values '$c_b$', '$d_b$', '$e_b$' and '$g_f$' are approximated by rational numbers, and wherein in said diagonal matrix said values 'b' and 'f' are adjusted to $$b = \frac{1}{\sqrt{2}} \frac{1}{\sqrt{1+c_b^2+d_b^2+e_b^2}} \text{ and}$$

$$f = \frac{1}{2} \frac{1}{\sqrt{1+g_f^2}},$$

values '$c_b$', '$d_b$', '$e_b$' and '$g_f$' being in said equation said rational numbers.

13. A method according to claim 1, wherein for a two-dimensional transform to be applied to two-dimensional digital data, said simplified predetermined transform matrix with said approximated elements and a transpose of said simplified transform matrix with said approximated elements are employed as basis for implementing said transform, said extended quantization including operations removed from both of said matrices, which operations are adjusted to compensate for said approximations in both of said matrices.

14. A method according to claim 1, wherein for quantization, a quantization matrix is determined by multiplying a predetermined sequence of quantization coefficients with a matrix extracted from said predetermined transform matrix for simplifying said predetermined transform matrix, which extracted matrix comprises said operations removed from said predetermined transform matrix, and which extracted matrix is adjusted to compensate for said approximation of elements of said simplified transform matrix by rational numbers.

15. A method for implementing a dequantization operation and for implementing an approximation of an inverse discrete cosine transform (IDCT), the dequantization operation and inverse discrete cosine transform to be applied in sequence for decompression of compressed digital data, the method comprising:

simplifying a predetermined inverse transform matrix to require less operations when applied to digital data, thereby forming a simplified inverse transform matrix;

approximating elements of said simplified inverse transform matrix constituting irrational numbers by rational numbers;

extending a predetermined dequantization operation to include operations removed by simplifying the predetermined inverse transform matrix, thereby forming an extended dequantization operation;

adjusting the extended dequantization operation to compensate for approximation of elements of said simplified inverse transform matrix by rational numbers; and employing said extended dequantization operation and said simplified inverse transform matrix with said approximated elements as basis for implementing said sequence of dequantization operation and inverse discrete cosine transform.

16. A method according to claim 15, wherein for dequantization, a dequantization matrix is determined by multiplying a predetermined sequence of dequantization coefficients with a matrix extracted from said predetermined inverse transform matrix for simplifying said predetermined inverse transform matrix, which extracted matrix comprises said operations removed from said predetermined inverse transform matrix, and which extracted matrix is adjusted to compensate for said approximation of elements of said simplified inverse transform matrix by rational numbers.

17. A method according to claim 15, wherein said step of simplifying said predetermined inverse transform matrix to require less operations when applied to digital data comprises factoring said predetermined inverse transform matrix into a diagonal matrix to be used for extending said predetermined dequantization and a simplified inverse transform matrix.

18. A method according to claim 15, wherein said rational numbers can be represented by fractions having a denominator equal to $2^n$, wherein n is an integer.

19. A method according to claim 18, wherein in said inverse transform implementation divisions are realized by bit-shifting.

20. A method according to claim 15, wherein said approximation is adjusted in a way ensuring that a resulting inverse transform corresponds to a transform, i.e. that said predetermined inverse transform matrix, including said approximations, multiplied by a transpose of said predetermined inverse transform matrix, including said approximations, is equal to an identity matrix.

21. A method according to claim 15, wherein said predetermined inverse transform matrix is a 4×4 matrix of a form $$\begin{bmatrix} a & b & a & c \\ a & c & -a & -b \\ a & -c & -a & b \\ a & -b & a & -c \end{bmatrix},$$

wherein a=½, b=√½ ·cos (π/8), c=√½ ·cos(3π/8), wherein 'c' is substituted in said matrix according to an equation d=c/b, and wherein said predetermined inverse transform matrix is simplified by factoring said predetermined inverse transform matrix into a diagonal matrix comprising diagonal values {a, b, a, b} and a simplified inverse transform matrix comprising only elements having absolute values of '1' and 'd', which diagonal matrix is to be used for extending said predetermined dequantization.

22. A method according to claim 21, wherein in said simplified inverse transform matrix said value 'd' is approximated by a rational number 7/16.

23. A method according to claim 21, wherein in said simplified inverse transform matrix said value 'd' is approximated by a rational number, and wherein in said diagonal matrix said value 'b' is adjusted to $$b = \sqrt{\frac{0.5}{1+d^2}},$$

'd' being in said equation said rational number.

24. A method according to claim 21, wherein in said simplified inverse transform matrix said value 'd' is approximated by a rational number 7/16, and wherein said inverse is implemented for a transform of a one-dimensional sequence of four values X[0], X[1], X[2], X[3] respectively with the following equations:

$e=X[0]+X[3]$, $f=X[1]+X[2]$, $Y[0]=e+f$, $Y[2]=e-f$, $e=X[0]-X[3]$, $f=X[1]-X[2]$, $Y[1]=e+(f-f/8)/2$, and $Y[3]=(e-e/8)/2-f$, wherein Y[0], Y[1], Y[2], Y[3] is a one-dimensional sequence of four transformed values, and wherein e and f are auxiliary variables.

25. A method according to claim 15, wherein said predetermined inverse transform matrix is a 8×8 matrix of a form:

$$\begin{bmatrix} a & b & f & c & a & d & g & e \\ a & c & g & -e & -a & -b & -f & -d \\ a & d & -g & -b & -a & e & f & c \\ a & e & -f & -d & a & c & -g & -b \\ a & -e & -f & d & a & -c & -g & b \\ a & -d & -g & b & -a & -e & f & -c \\ a & -c & g & e & -a & b & -f & d \\ a & -b & f & -c & a & -d & g & -e \end{bmatrix}$$

wherein a=1/(2√2), b=½·cos (π/16), c=½·cos (3π/16), d=½·cos (5π/16), e=½·cos (7π/16), f=½·cos (π/8), g=½·cos (3π/8), wherein 'c' is substituted in said matrix according to an equation $c_b$=c/b, wherein 'd' is substituted in said matrix according to an equation $d_b$=d/b, wherein 'e' is substituted in said matrix according to an equation $e_b$=e/b, wherein 'g' is substituted in said matrix according to an equation $g_f$=g/f, and wherein said predetermined inverse transform matrix is simplified by factoring said predetermined inverse transform matrix into a diagonal matrix comprising diagonal values {a, b, f, b, a, b, f, b} and a simplified inverse transform matrix comprising only elements having absolute values of '1', '$c_b$', '$d_b$', '$e_b$' and '$g_f$', which diagonal matrix is to be used for extending said predetermined dequantization.

26. A method according to claim 25, wherein in said simplified inverse transform matrix said value '$c_b$' is approximated by a rational number $15/16$, said value '$d_b$' is approximated by a rational number $9/16$, said value '$e_b$' is approximated by a rational number $1/4$, and said value '$g_f$' is approximated by a rational number $7/16$.

27. A method according to claim 25, wherein in said simplified inverse transform matrix said values '$c_b$', '$d_b$', '$e_b$' and '$g_f$' are approximated by rational numbers, and wherein in said diagonal matrix said values 'b' and 'f' are adjusted to $$b = \frac{1}{\sqrt{2}} \frac{1}{\sqrt{1+c_b^2+d_b^2+e_b^2}} \text{ and } f = \frac{1}{2}\frac{1}{\sqrt{1+g_f^2}},$$

values '$c_b$', '$d_b$', '$e_b$' and '$g_f$' being in said equation said rational numbers.

28. A method according to claim 15, wherein for a two-dimensional inverse transform to be applied to two-dimensional dequantized digital data, said simplified predetermined inverse transform matrix with said approximated elements and a transpose of said simplified inverse transform matrix with said approximated elements are employed as basis for implementing said inverse transform, said extended dequantization operation including operations removed from both of said matrices, which operations are adjusted to compensate for said approximations in both of said matrices.

29. An encoder for compressing digital data comprising:
a transformer arranged to approximate a discrete cosine transform (DCT) for transforming digital data by applying a simplified transform matrix to said digital data, the simplified transform matrix being obtained by simplifying a predetermined transform matrix to require less operations when applied to digital data, and in which simplified transform matrix elements constituting irrational numbers are approximated by rational numbers; and
a quantization means coupled to an output of said transformer, arranged to quantize transformed digital data by performing an extended quantization operation, the extended quantization operation being obtained from a predetermined quantization operation by including operations removed by simplifying the predetermined transform matrix, said extended quantization operation being adjusted to compensate for said approximation of elements of said simplified transform matrix.

30. A decoder for decompressing digital data comprising:
a dequantization means arranged to dequantize compressed digital data with an extended dequantization operation; and
a transformer arranged to approximate an inverse discrete cosine transform (IDCT) coupled to an output of said dequantization means for transforming dequantized digital data by applying a simplified inverse transform matrix, the simplified inverse transform matrix being obtained by simplifying a predetermined inverse transform matrix to require less operations when applied to digital data, and in which simplified inverse transform matrix elements constituting irrational numbers are approximated by rational numbers;
wherein the extended dequantization operation applied by said dequantization means is obtained from a predetermined dequantization operation by including operations removed by simplifying the predetermined inverse transform matrix, said extended dequantization operation being adjusted to compensate for said approximation of elements of said simplified inverse transform matrix.

31. A method of encoding digital data, the method comprising:
transforming said digital data by applying a simplified transform matrix to said digital data, the simplified transform matrix being obtained by simplifying a predetermined transform matrix to require less operations when applied to digital data, and in which simplified transform matrix elements constituting irrational numbers are approximated by rational numbers; and
quantizing said transformed digital data by performing an extended quantization operation, the extended quantization operation being obtained from a predetermined quantization operation by including operations removed by simplifying the predetermined transform matrix, said extended quantization operation being adjusted to compensate for said approximation of elements of said simplified transform matrix.

32. A method of decoding compressed digital data, the method comprising:
dequantizing said compressed digital data with an extended dequantization operation; and
transforming said dequantized digital data by applying a simplified inverse transform matrix, the simplified inverse transform matrix being obtained by simplifying a predetermined inverse transform matrix to require less operations when applied to digital data, and in which simplified inverse transform matrix elements constituting irrational numbers are approximated by rational numbers;
wherein the extended dequantization operation is obtained from a predetermined dequantization operation by including operations removed by simplifying the predetermined inverse transform matrix, said extended dequantization operation being adjusted to compensate for said approximation of elements of said simplified inverse transform matrix.

* * * * *